(12) United States Patent
Burlingham et al.

(10) Patent No.: US 9,635,638 B1
(45) Date of Patent: Apr. 25, 2017

(54) RECOMMENDING NOTIFICATION SOUNDS THAT PROMOTE USER ACKNOWLEDGMENT TO NOTIFICATIONS

(71) Applicant: Lenovo Enterprise Solutions (Singapore) PTE. LTD., New Tech Park (SG)

(72) Inventors: Jennifer Lynn Burlingham, Holly Springs, NC (US); Gary David Cudak, Wake Forest, NC (US); Joseph Francis Herman, Raleigh, NC (US); James Ray Lee, Raleigh, NC (US); John M. Weber, Wake Forest, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/965,601

(22) Filed: Dec. 10, 2015

(51) Int. Cl.
  *H04W 68/00* (2009.01)
  *H04M 1/725* (2006.01)
  *H04W 4/18* (2009.01)

(52) U.S. Cl.
  CPC ..... *H04W 68/005* (2013.01); *H04M 1/72522* (2013.01); *H04W 4/18* (2013.01)

(58) Field of Classification Search
  CPC .................................................. H04W 68/005
  See application file for complete search history.

(56) References Cited

U.S. PATENT DOCUMENTS

| | | | | |
|---|---|---|---|---|
| 2006/0233381 A1* | 10/2006 | Seo | ............ | H04S 1/007 381/56 |
| 2013/0076750 A1* | 3/2013 | Park | ............ | G09G 3/36 345/428 |
| 2013/0158987 A1* | 6/2013 | Xing | ............ | G06F 17/276 704/10 |
| 2014/0074921 A1* | 3/2014 | Poornachandran | . | G06H 7/30867 709/204 |
| 2015/0195692 A1* | 7/2015 | Chow | ............ | H04M 19/04 455/414.1 |
| 2015/0297109 A1* | 10/2015 | Garten | ............ | A61B 5/04845 600/544 |

* cited by examiner

*Primary Examiner* — Christopher M Brandt
(74) *Attorney, Agent, or Firm* — Jason Friday

(57) ABSTRACT

A computing device determines responsiveness of a user to notification sounds output by the computing device, by determining whether for each notification sound the user acknowledged a notification corresponding to the notification sound on the computing device. The computing device can determine characteristics of the notification sounds output by the computing device. The computing device recommends suggested notification sounds that promote user acknowledgment to notifications, for use in relation to future notifications. The computing device may determine other notification sounds that share the characteristics of the notification sounds for which the user acknowledged the notifications corresponding to the notification sounds on the computing device. The suggested notification sounds can include the other notification sounds, and/or the notification sounds output by the computing device for which the user acknowledged the notifications corresponding to the notification sounds on the computing device.

20 Claims, 3 Drawing Sheets

RECOMMENDING NOTIFICATION SOUNDS THAT PROMOTE USER ACKNOWLEDGMENT TO NOTIFICATIONS

BACKGROUND

Computing devices like smartphones commonly provide notifications to their users in response to incoming data, such as phone calls, email, and text messages. The notifications have corresponding notification sounds, so that the users can be alerted to the incoming data. When alerted to incoming data via a notification sound, a user may view the corresponding notification on his or her computing device, and then decide whether to act on the notification, dismiss the notification, or ignore the notification entirely. For example, with respect to an incoming phone call, a user may act on a notification by answering the phone call, dismiss the notification by sending the phone call to voice mail, or ignore the notification by simply placing his or her smartphone back into a pocket or purse after viewing the notification.

SUMMARY

An example method includes determining, by a computing device, responsiveness of a user to notification sounds output by the computing device, by determining whether for each notification sound the user acknowledged a notification corresponding to the notification sound on the computing device. The method includes recommending, by the computing device, suggested notification sounds that promote user acknowledgment to notifications, for use in relation to future notifications.

An example computing device includes a speaker to output notification sounds, an acknowledgment device to receive user acknowledgment of notifications corresponding to the notification sounds, a processor, and a non-transitory computer-readable data storage medium storing computer-executable code. The processor executes the code to determine responsiveness of a user to the notification sounds output by the speaker, by determining whether for each notification sound the user acknowledged the notification corresponding to the notification sound on the acknowledgment device. The processor executes the code to recommend suggested notification sounds that promote user acknowledgment to notifications, for use in relation to future notifications.

An example non-transitory computer-readable data storage medium stores computer-executable code executable by a computing device to a perform a method. The method includes determining responsiveness of a user to notification sounds output by the computing device, by determining whether for each notification sound the user acknowledged a notification corresponding to the notification sound on the computing device. The method includes determining characteristics of the notification sounds output by the computing device. The method includes recommending suggested notification sounds that promote user acknowledgment to notifications, for use in relation to future notifications, including determining other notification sounds that share the characteristics of the notification sounds for which the user acknowledged the notifications corresponding to the notification sounds on the computing device. The suggested notification sounds include the other notification sounds, and the notification sounds output by the computing device for which the user acknowledged the notifications corresponding to the notification sounds on the computing device.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a computing device like a smartphone commonly provides notifications to its user in response to incoming data, and alerts the user to these notifications by outputting corresponding notification sounds. For a particular type of notification, such as an incoming phone call, the user is generally afforded the ability to choose the corresponding notification sound, such as a ringtone. Many users, for instance, change ringtones frequently, to individualize their smartphones.

However, different notification sounds have different characteristics, and therefore differ in the likelihood that a given user will be able to hear them. For example, ringtones can vary in volume, frequency range, duration, tempo, and genre. A user may miss phone calls because the user did not hear the ringtone if the selected ringtone has too low a volume, a particular frequency range, and so on.

Disclosed herein are techniques to ensure that users are able to hear the notification sounds that are output by computing devices like smartphones for notifications. The responsiveness of a user to notification sounds that are output is determined, by determining whether for each notification sound the user acknowledges the corresponding notification. As the user changes the notification sounds that are used, therefore, the computing device is able to determine which notification sounds the user acknowledged, and thus was able to hear. Suggested notification sounds that promote user acknowledge to notifications for use in relation to future notifications are then recommended.

Figure 1:
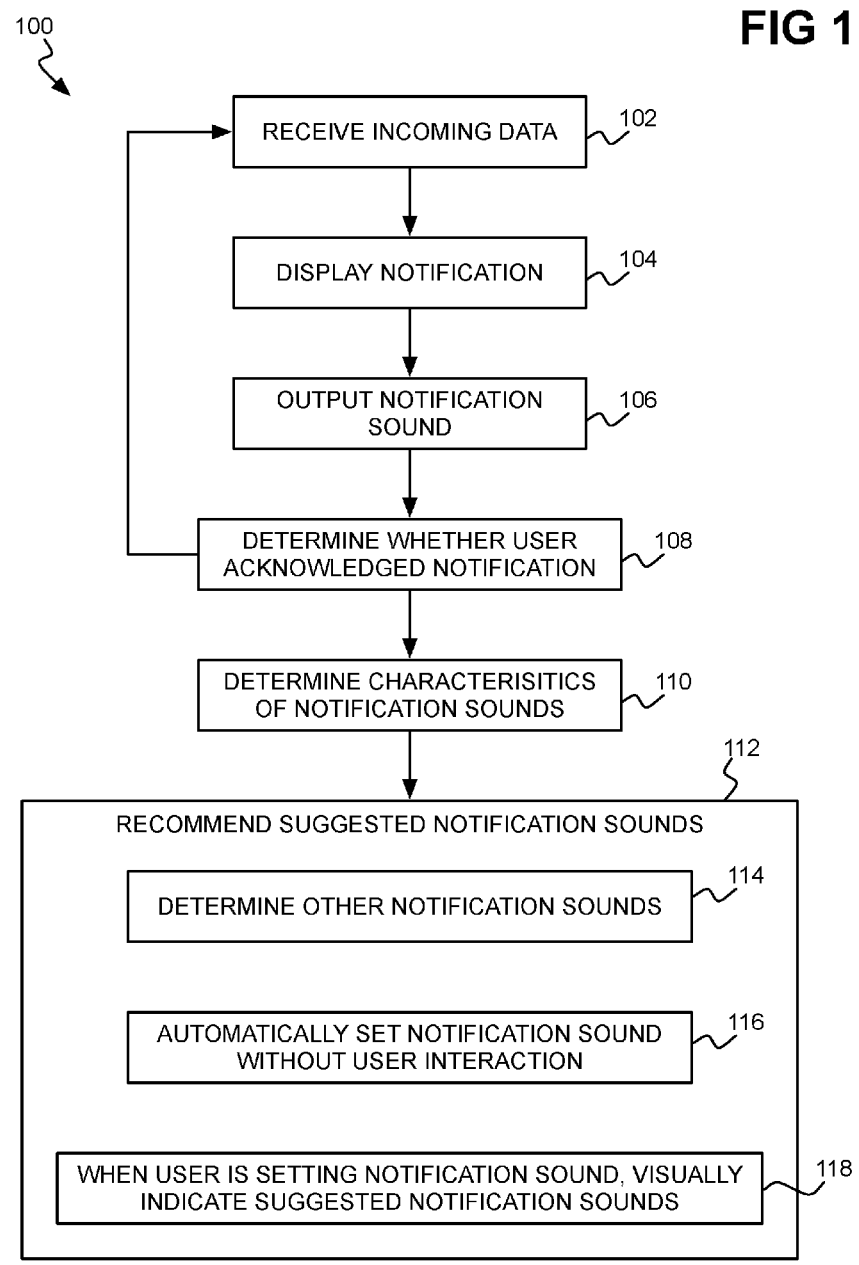
FIG. 1 is a flowchart of an example method for recommending notification sounds that promote user acknowledgement to notifications.

FIG. 1 shows an example method 100. The method 100 is performed by a computing device. The computing device can be a mobile computing device, such as a smartphone, a laptop or desktop computer, or a tablet computing device.

The computing device can be another type of computing device as well, such as a desktop computer.

The computing device receives incoming data (102). Different types of incoming data include incoming phone calls, incoming text messages, and incoming messages. Another type of incoming data can be in the form of an alert that an application program, such as an app in the case of a smartphone for instance, generates. Application program-generated data are thus considered as incoming data within the context of the method 100.

The computing device displays a notification corresponding to the incoming data (104). For example, for an incoming phone call, the notification may include the phone number of the party initiating the phone call to the computing device, as well as caller identification information. For a text message, the notification may be the text message itself, as well as an identity of the party that sent the text message. For an email, the notification may identify the sender of the email, and may include a portion of the email itself, such as the subject line, a part of the body of the email, and so on.

A notification has a notification type, which corresponds to the type of incoming data to which the notification relates. Therefore, there can be one type of notification for incoming phone calls, another type of notification for incoming text messages, and still another type for incoming emails. For application program-generated alerts, each application program may be considered as having its own notification type, or there may be one notification type for such alerts, regardless of which application program generated the alert.

The computing device outputs a notification sound corresponding to the notification (106). For example, for an incoming phone call notification, the notification sound may be a ringtone, which the user may be able to selectively change via a setting of the computing device. Similarly, there may be one notification sound for an incoming text message, another notification sound for an incoming email, and a third notification sound for an application program-generated alert (where the sound may be the same or different on an application program-by-application program basis). The purpose of having different notification sounds for different types of notifications is so that the user of the computing device is able to distinguish among the different types of notifications without having to look at the computing device.

The computing device 100 determines, or detects, whether the user has acknowledged the notification (108). User acknowledgment of the notification can take many different forms. The user may simply move the computing device to view the notification, for instance, without performing any further action. Such computing device movement is considered notification acknowledgment, and this type of ignoring of the notification is different than if the user did not move the computing device to view the notification, the latter suggesting that the user may not have heard the notification.

As another example of user acknowledgment of the notification, the user may view the notification and then perform a user interface action in relation to the computing device to dismiss the notification. For instance, for an incoming phone call, the user may press a button or a graphical user interface element on the screen to silence the notification sound and/or cause the phone call to go straight to voicemail. As a third example of notification acknowledgment, the user may view the notification and then perform a user interface action in relation to the computing device to initiate an action to positively act upon the notification. For instance, for an incoming phone call, the user may press a button or a graphical user interface element on the screen to answer the phone call.

Parts 102, 104, 106, and 108 are repeated for each new notification. Therefore, over time, the computing device is able to determine which notifications the user acknowledged, and which notifications the user did not acknowledge. For each notification, the computing device tracks at least the notification sound that was used, and whether the notification was acknowledged or not. The computing device may also track where the computing device was located when a notification was displayed, and the time at which the notification was displayed.

At some point, the method 100 proceeds to part 110. For example, in response to a user action to change a notification sound for a particular type of notification, the method 100 may proceed to part 110. As another example, the method 100 may proceed to part 110 periodically, such as every few days, and so on.

The computing device may determine the characteristics of the notification sounds that were output in various iterations of part 106 (110). The characteristics of a notification sound can include its volume, frequency range, duration or length, tempo (i.e., fast or slow), and genre. The genre of a notification sound may be divided into music (or different types of music), people's voices, sounds, and so on. The computing device 100 may determine the characteristics of each notification sound in this respect by either performing auditory analysis on the notification sound, or by looking up the notification sound within a data store that stores this information.

The computing device recommends suggested notification sounds that promote user acknowledgment to notifications, for use in relation to future notifications (112). In one implementation, the suggested notification sounds can include those of the notification sounds that were previously output in part 106 that correspond to notifications that the user acknowledged. A limited number of such notification sounds may be suggested, such as an absolute number, or those for which user acknowledgment exceeded a threshold. For example, the threshold may be set to 75%, which means that when a notification sound was output for notifications, if the notifications were acknowledged by the user more than 75% of the time, then the notification sound is a suggested sound that is recommended.

In another implementation, the computing device may also or only determine other notification sounds (114). Such other notification sounds are not those that were previously output in part 106. Rather, the other notification sounds are notification sounds that were not previously used, but share one or more of the characteristics of the notification sounds that correspond to notifications that the user acknowledged. For example, if the user acknowledged notifications that had corresponding notification sounds that were loud, at low frequency, had a duration of at least five seconds, up tempo, and of music, then other notification sounds that share these same characteristics may be considered suggested notification sounds.

The type of analysis that is employed to determine the other notification sounds that share characteristics of the notification sounds that correspond to notifications that the user acknowledged can be sophisticated in this respect. For instance, over time it may be determined that the frequency range of a notification sound is the primary characteristic that determines whether a user is likely to acknowledge a corresponding notification, and not volume, length, tempo, or genre. In such instance, the other notification sounds that are suggested can therefore include those that have a similar frequency range, regardless of volume, length, tempo, or genre.

The notification sounds suggested can vary by notification type. Thus, the computing device can recommend different suggested notification sounds for phone calls than for text messages. Stated another way, the notification sounds that are considered when determining the suggested notification sounds can be on a notification type basis. Similarly, the notification sounds suggested can additionally or alternatively vary by computing device location or by time period. For example, it may be determined that the user acknowledges notifications during the day when high frequency notification sounds are output, and that the user acknowledges notifications during the evening when low frequency notification sounds are output. As another example, it may be determined that the user acknowledges notifications when in a restaurant only if the notification sounds are loud, whereas the user acknowledges notifications regardless of volume level when in a library or at home or work.

In one implementation, the computing device, for a particular notification type, automatically sets the notification sound without user interaction (116). For example, the user may have previously specified a setting allowing the computing device to automatically change the notification sound used for incoming phone calls so that the user is most likely to hear the notification sound. Therefore, at periodic intervals, the computing device may change the notification sound without direct approval from the user to a suggested notification sound that the computing device has determined the user is most likely to hear. That is, the computing device changes the notification sound to that which the computing device predicts is most likely to elicit acknowledgment of the corresponding notification by the user.

In another implementation, the computing device may visually indicate the suggested notification sound when the user is in the process of setting the notification sound for a particular notification type (118). By highlighting or ranking the suggested notification sounds, the computing device provides the user with information as to which notification sounds the user is most likely to hear. That is, the computing device visually indicates the notification sounds that the computing device predicts are most likely to elicit acknowledgment of the corresponding notification by the user. However, the user still makes the final decision as to which notification sound to use for a particular notification type.

Figure 2:
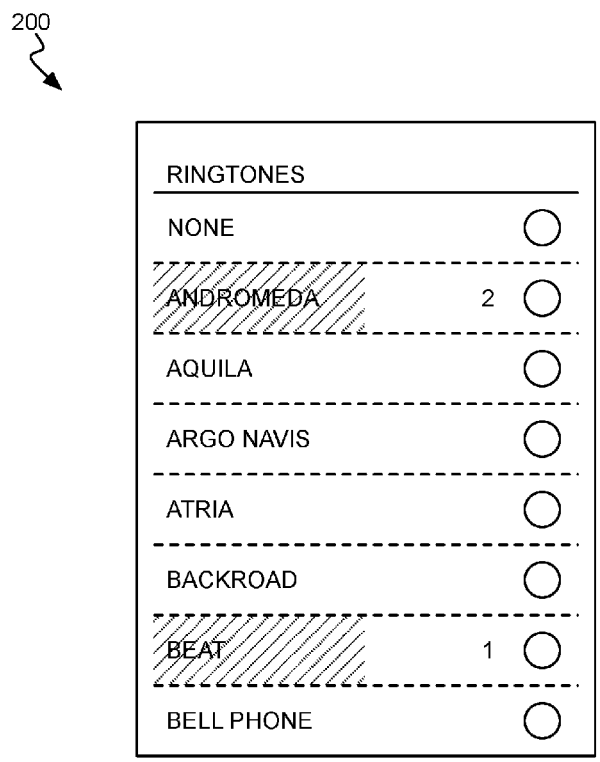
FIG. 2 is a diagram of an example graphical user interface by which a user selects a notification sound, and in which suggested notification sounds are visually indicated.

FIG. 2 shows an example graphical user interface 200 that a computing device like a smartphone may display to permit the user to select a notification sound for a particular notification type in part 118 of the method 100. The interface 100 specifically pertains to ringtones for incoming phone calls. There are eight example notification sounds from which the user may select: None (i.e., no ring tone), Andromeda, Aquila, Argo Navis, Atria, Backroad, Beat, and Bell Phone. The user chooses which notification sound to use by selecting the corresponding circle to the right of the ringtone's name.

Furthermore, the computing device has visually identified two suggested notifications in two different ways in the graphical user interface 200. First, both the Aquila and Beat ringtones are displayed against a different background color, which is indicated in FIG. 2 via shading. Second, the Aquila and Beat ringtones have numbers next to their selection circles that indicate the ranking of the two ringtones as to the likelihood that the user will hear the ringtone (and thus will acknowledge an incoming phone call). In the example of FIG. 2, the Beat ringtone is ranked highest in this respect, and the Aquila ringtone is ranked second.

Figure 3:
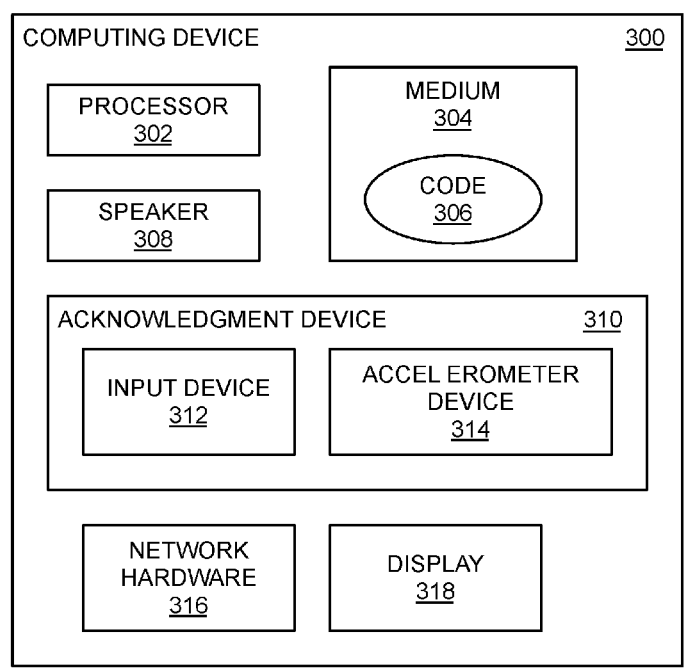
FIG. 3 is a diagram of an example computing device.

FIG. 3 shows an example computing device 300. The computing device 300 may be a smartphone, a tablet device, a desktop computer, a laptop computer, or another type of computing device. The computing device 300 can include other components in addition to and/or in lieu of those depicted in FIG. 3. The computing device 300 includes a processor 302 and a computer-readable data storage medium 304, such as volatile or non-volatile semiconductor memory, hard disk drives, and so on. The medium stores computer-executable code 306 that the processor 302 executes to perform the method 100 that has been described.

The computing device 300 can include a speaker 308 to output notification sounds. The computing device 300 includes an acknowledgment device 310 by which the user can acknowledge notifications corresponding to the notification sounds. For example, the acknowledgment device 310 can be or include an input device 312, such as a touchscreen, physical buttons, and so on, that the user can interact with to acknowledge notifications. As another example, the acknowledgment device 310 can be or include an accelerometer device 314 that detects when the computing device 300 is being moved. Thus, the accelerometer device 314 can detect acknowledgment of a notification when, for instance, the user moves the computing device 300 to view the notification after the user heard the notification sound output by the speaker 308.

The computing device 300 can include network hardware 316. The network hardware 316 may be in the form of a wired or wireless network adapter, a telephony network adapter, and so on. The network hardware 316 can permit the computing device 300 to receive incoming data for which the device 300 provides notifications. The computing device 300 can also include a display 318. If the display 318 is a touchscreen display, then the display 318 may be or may be a part of the input device 312 in one implementation.

The techniques that have been disclosed herein provide for a way by which notification sounds are recommended to promote user acknowledgment of corresponding notifications, such as for incoming data like phone calls, text messages, and emails. User acknowledgement of notifications is promoted in that the more likely a user will be able to hear a notification sound, the more likely the user will then acknowledge the corresponding notification. As such, user experience of the computing device 300 is increased, because the user is less likely to become frustrated as a result of missed phone calls, text messages, and so on.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:
1. A method comprising:
    determining, by a computing device, responsiveness of a user to notification sounds output by the computing device, by determining whether for each notification sound the user acknowledged a notification corresponding to the notification sound on the computing device; and recommending, by the computing device, suggested notification sounds that promote user acknowledgment to notifications, for use in relation to future notifications, wherein at least some of the notification sounds are different from one another.

2. The method of claim 1, further comprising:

determining, by the computing device, characteristics of the notification sounds output by the computing device, wherein recommending the suggested notification sounds comprises:

determining other notification sounds that share the characteristics of the notification sounds for which the user acknowledged the notifications corresponding to the notification sounds on the computing device, and wherein the suggested notification sounds include at least the other notification sounds.

3. The method of claim 2, wherein the characteristics comprise one or more of: volume; frequency range; duration; tempo; and genre.

4. The method of claim 1, wherein the suggested notification sounds include at least the notification sounds output by the computing device for which the user acknowledged the notifications corresponding to the notification sounds on the computing device.

5. The method of claim 1, wherein recommending the suggested notification sounds comprises:

automatically setting a corresponding notification sound that is predicted to elicit user acknowledgment for the future notifications of a particular type, without user interaction.

6. The method of claim 1, wherein recommending the suggested notification sounds comprises:

when the user is setting a corresponding notification sound for the future notifications of a particular type, visually indicating the suggested notification sounds that are predicted to elicit user acknowledgement.

7. The method of claim 1, wherein the responsiveness of the user to the notification sounds output by the computing device is tracked over one or more of location of the computing device and time period, wherein recommending the suggested notification sounds comprises recommending different of the suggested notification sounds for one or more of different locations and different time periods.

8. The method of claim 1, wherein the responsiveness of the user to the notification sounds output by the computing device is tracked by notification type of the notifications corresponding to the notification sounds, wherein recommending the suggested notification sounds comprises recommending different of the suggested notification sounds for different notification types of the future notifications.

9. The method of claim 1, wherein the notification sounds comprise one or more of:

ring tones that are output in response to incoming phone calls;

notification sounds that are output in response to incoming text messages;

notification sounds that are output in response to incoming email messages.

10. The method of claim 1, wherein the user acknowledgement of a notification comprises the user utilizing the computing device in response to the notification, including one or more of:

dismissing the notification by performing a user interface interaction on the computing device;

initiating an action to positively act upon the notification by performing a user interface interaction on the computing device;

moving the computing device to view the notification.

11. A computing device comprising:

a speaker to output notification sounds;

an acknowledgment device to receive user acknowledgment of notifications corresponding to the notification sounds;

a processor;

a non-transitory computer-readable data storage medium storing computer-executable code that the processor executes to:

determine responsiveness of a user to the notification sounds output by the speaker, by determining whether for each notification sound the user acknowledged the notification corresponding to the notification sound on the acknowledgment device; and recommend suggested notification sounds that promote user acknowledgment to notifications, for use in relation to future notifications, wherein at least some of the notification sounds are different from one another.

12. The computing device of claim 11, wherein the processor executes the computer-executable code to further:

determine characteristics of the notification sounds output by the speaker, wherein the processor is to recommend the suggested notification sounds by:

determining other notification sounds that share the characteristics of the notification sounds for which the user acknowledged the notifications corresponding to the notification sounds using the acknowledgment device, and wherein the suggested notification sounds include at least the other notification sounds.

13. The computing device of claim 11, wherein the suggested notification sounds include at least the notification sounds output by the speaker for which the user acknowledged the notifications corresponding to the notification sounds on the acknowledgment device.

14. The computing device of claim 11, wherein the processor is to recommend the suggested notification sounds by:

automatically setting a corresponding notification sound that is predicted to elicit user acknowledgment for the future notifications of a particular type, without user interaction.

15. The computing device of claim 11, wherein the processor is to recommend the suggested notification sounds by:

when the user is setting a corresponding notification sound for the future notifications of a particular type, visually indicating the suggested notification sounds that are predicted to elicit user acknowledgement.

16. The computing device of claim 11, wherein the responsiveness of the user to the notification sounds output by the speaker is tracked over one or more of location of the computing device and time period, wherein the processor is to recommend the suggested notification sounds by:
recommending different of the suggested notification sounds for one or more of different locations and different time periods.

17. The computing device of claim 11, wherein the responsiveness of the user to the notification sounds output by the speaker is tracked by notification type of the notifications corresponding to the notification sounds,
wherein recommending the suggested notification sounds comprises recommending different of the suggested notification sounds for different notification types of the future notifications.

18. The computing device of claim 11, wherein one or more of:
the acknowledgment device comprises an accelerometer device, and the user acknowledgement of a notification comprises moving the computing device, as detected by the accelerometer device, to view the notification
the acknowledgment device comprises an input device, and the user acknowledgement of a notification comprises one or more of:
dismissing the notification by performing a user interface interaction via the input device;
initiating an action to positively act upon the notification by performing a user interface interaction via the input device;
moving the computing device to view the notification.

19. The computing device of claim 11, wherein the computing device is one of a: desktop computing device, a laptop or notebook computing device, a tablet computing device, and a smart phone computing device.

20. A non-transitory computer-readable data storage medium storing computer-executable code executable by a computing device to a perform a method comprising:
determining responsiveness of a user to notification sounds output by the computing device, by determining whether for each notification sound the user acknowledged a notification corresponding to the notification sound on the computing device;
determining characteristics of the notification sounds output by the computing device; and
recommending suggested notification sounds that promote user acknowledgment to notifications, for use in relation to future notifications, including determining other notification sounds that share the characteristics of the notification sounds for which the user acknowledged the notifications corresponding to the notification sounds on the computing device,
wherein the suggested notification sounds include the other notification sounds, and the notification sounds output by the computing device for which the user acknowledged the notifications corresponding to the notification sounds on the computing device,
wherein at least some of the notification sounds are different from one another.

* * * * *